(No Model.)

J. R. ENOS.
CARRIAGE JACK.

No. 326,024. Patented Sept. 8, 1885.

Witnesses
David Runyon
S. A. Bullard

Inventor
John R. Enos

UNITED STATES PATENT OFFICE.

JOHN R. ENOS, OF BUFFALO HART, ASSIGNOR OF ONE-HALF TO GEO. W. BULLARD, OF SPRINGFIELD, ILLINOIS.

CARRIAGE-JACK.

SPECIFICATION forming part of Letters Patent No. 326,024, dated September 8, 1885.

Application filed July 11, 1885. (No model.)

*To all whom it may concern:*

Be it known that I, JOHN R. ENOS, a citizen of the United States, residing at Buffalo Hart, in the county of Sangamon and State of Illinois, have invented a new and useful Improvement in Carriage-Jacks, of which the following is a specification.

My invention relates to that class of carriage-jacks commonly used for supporting the axle of a carriage or any vehicle while the spindle is being oiled or greased; and the object of my invention is to lift the axle until the wheel can be removed from the spindle for the purpose of being oiled and afterward be replaced. After the wheel is removed from the spindle it is used as a support for the apparatus, which not only supports the axle, but also holds the wheel in an upright position near the spindle while the operator is oiling it, after which it is replaced with the same ease with which it was removed. I attain these objects by means of the apparatus illustrated in the accompanying drawings, in which—

Figure 1:
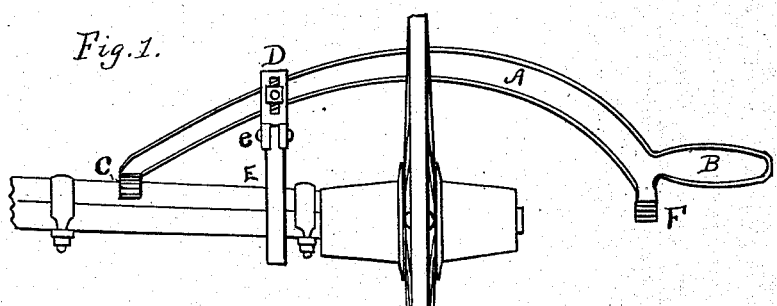
Figure 2:
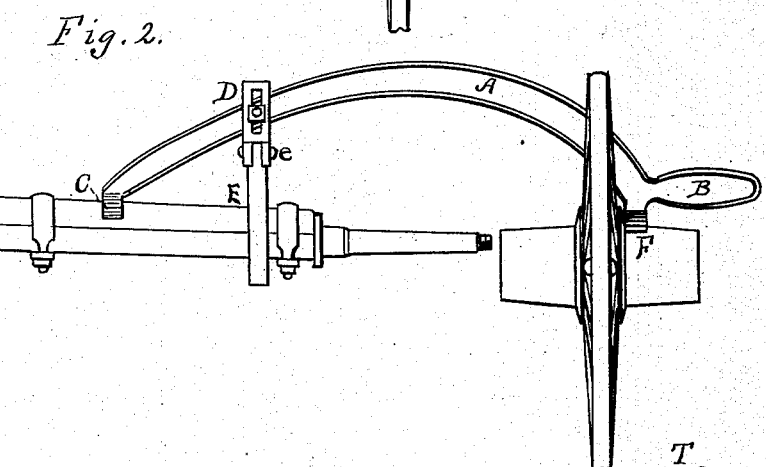
Figures 3, 4, 5:
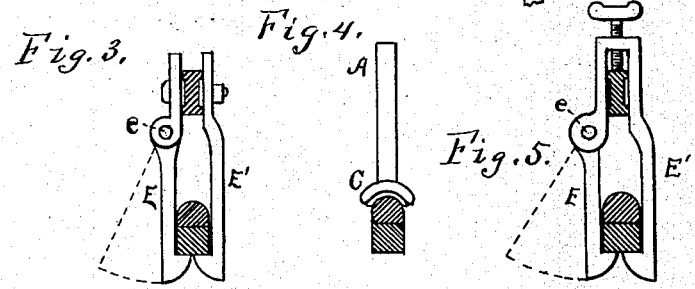

Figure 1 represents the apparatus attached to the axle preparatory to removing the wheel, a part of which only is represented. Fig. 2 represents the axle supported by the apparatus after the wheel is removed. Figs. 3 and 4 represent parts of the invention hereinafter described. Fig. 5 represents a modification.

Similar letters refer to similar parts throughout the drawings.

The invention is entirely of metal, and may be of malleable, cast, or wrought iron. It consists of a bowed lever-arm A with a handle, B. On the opposite end from the handle is a curved foot or fulcrum, C, (represented in Fig. 4,) so made as to fit the round upper side of the axle and to act as a fulcrum for the lifting force. The under side of this foot is leathered to prevent bruising the axle.

At D the two grappling-hooks E E' are bolted, one on each side of the arm A, as shown by Fig. 3, one of which is hinged at *e* to allow it to swing open until it may pass below the axle. But one straight hook, E', or two hinged hooks, like E, may be used. The hooks are slotted where bolted to the arm A, so they may be adjusted to fit any sized axle, the bearings of the arm and hooks where they come in contact being grooved or ratcheted to prevent their slipping; or the upper part of the hooks may be cast in one U-shaped piece with a thumb-screw, T, Fig. 5, to adjust the hooks, which will slide between guides cast on the sides of the arm A.

Near the handle B is another foot, F, made to rest on the hub of the wheel, which acts as a support while the spindle is being oiled.

After the burr is removed from the spindle the invention is used by passing it between the spokes of the wheel, placing the foot C on top of the carriage-axle, letting the hook E swing open until the hooks E E' pass around the axle and close together under it. The operator then lifts the axle with one hand by the handle B and with the other hand slips the wheel off the spindle, the hub coming directly under the foot F, which is allowed to rest on it, thus supporting the axle clear until it is ready to have the wheel replaced.

I am aware that prior to my invention a similar carriage-jack has been used, and that a patent therefor was granted to James McFarland January 6, 1885, No. 301,453; but my invention is an improvement over the device described in said patent, inasmuch as it lifts the axle clear of the wheel, with no weight bearing on the threads of the spindle, so that washers may be renewed. I therefore do not claim such construction; but What I do claim as my invention, and desire to secure by Letters Patent, is—

The combination, in a lifting-jack, consisting of the bowed arm A, with the handle B, the fulcrum-bearing foot C, the adjustable lifting-hooks E E', and the supporting-foot F, all substantially as described, and for the purposes specified.

JOHN R. ENOS.

Witnesses:
 DAVID RUNYON,
 S. A. BULLARD.